July 31, 1951     M. B. SAWYER, SR     2,562,283
METAL CAST ELECTRIC MOTOR

Filed Feb. 11, 1946     2 Sheets-Sheet 1

Inventor
Marion B. Sawyer, Sr.
By Elvin A. Andrus
Attorney

July 31, 1951 M. B. SAWYER, SR 2,562,283
METAL CAST ELECTRIC MOTOR
Filed Feb. 11, 1946 2 Sheets-Sheet 2

Inventor
Marion B. Sawyer, Sr.
By Elwin A. Andrus
Attorney

Patented July 31, 1951

2,562,283

UNITED STATES PATENT OFFICE 2,562,283

METAL CAST ELECTRIC MOTOR

Marion B. Sawyer, Sr., Whittier, Calif., assignor to A. O. Smith Electrical Mfg. Co., Los Angeles, Calif., a corporation of California Application February 11, 1946, Serial No. 646,749

2 Claims. (Cl. 172—120)

1

This invention relates to a metal cast electric motor or other dynamo electric element and has particular reference to protecting the windings of the stator of a squirrel cage induction motor from oil, moisture or the like by casting a soft non-magnetic metal, such as solder around the laminations and windings to seal off the same and provide a solid protective covering therefor.

The principal object of the invention is to provide an electric motor element in which the windings are free from attack by oil or liquids in which the motor is operated.

Another object is to provide a covering for motor windings in which heat conduction is very efficient.

Another object is to provide a perfect seal against fluid leakage to the windings of a motor.

A further object is to provide a method of casting a solid metal protective covering around motor windings.

These and other objects of the invention will appear hereinafter in connection with the following description of an embodiment of the invention illustrated in the accompanying drawings.

Figure 1:
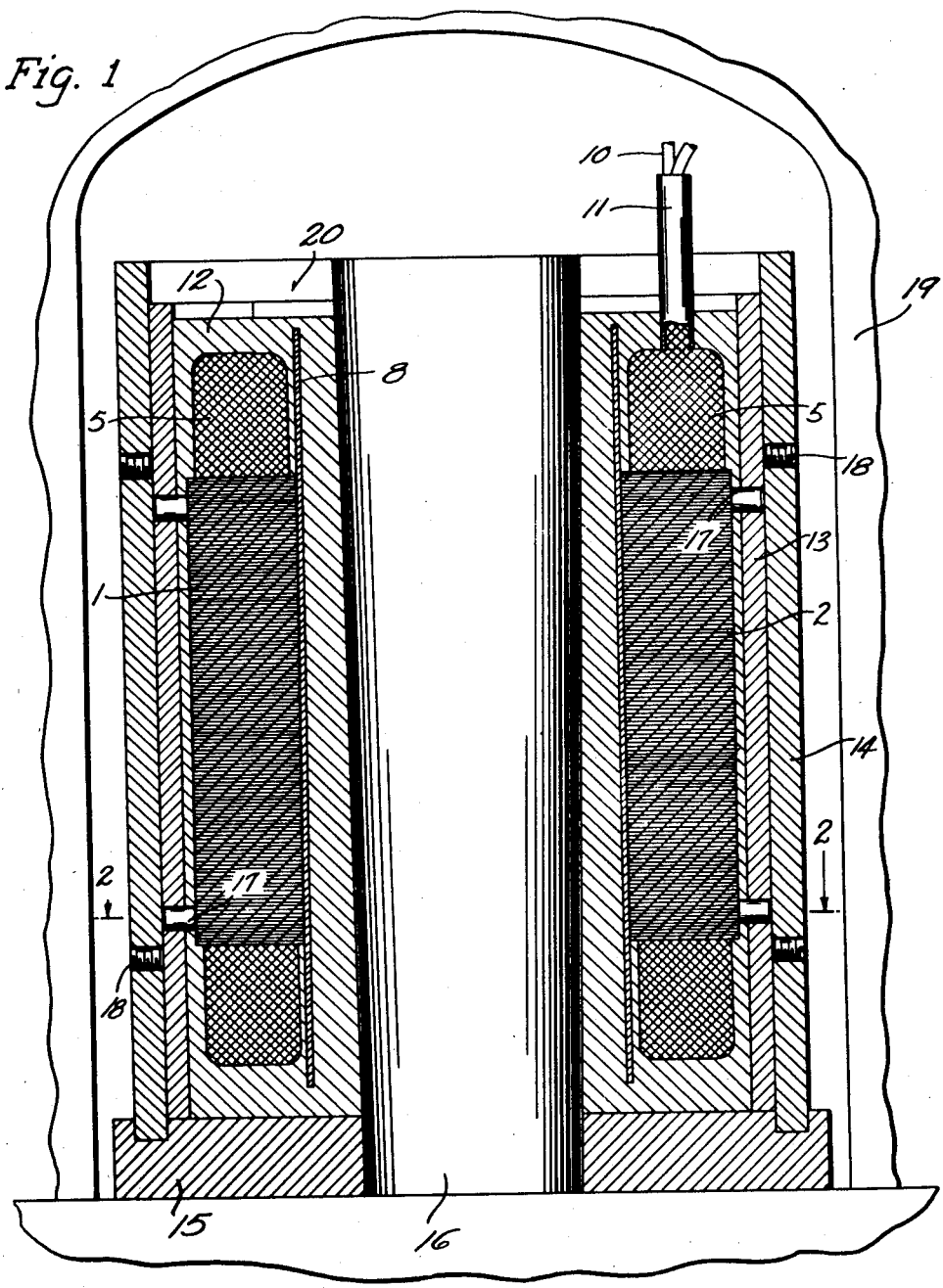
Figure 1 is a vertical sectional view of a stator held in a jig and after the pouring of the cast metal and location in the oven.
Figure 2:
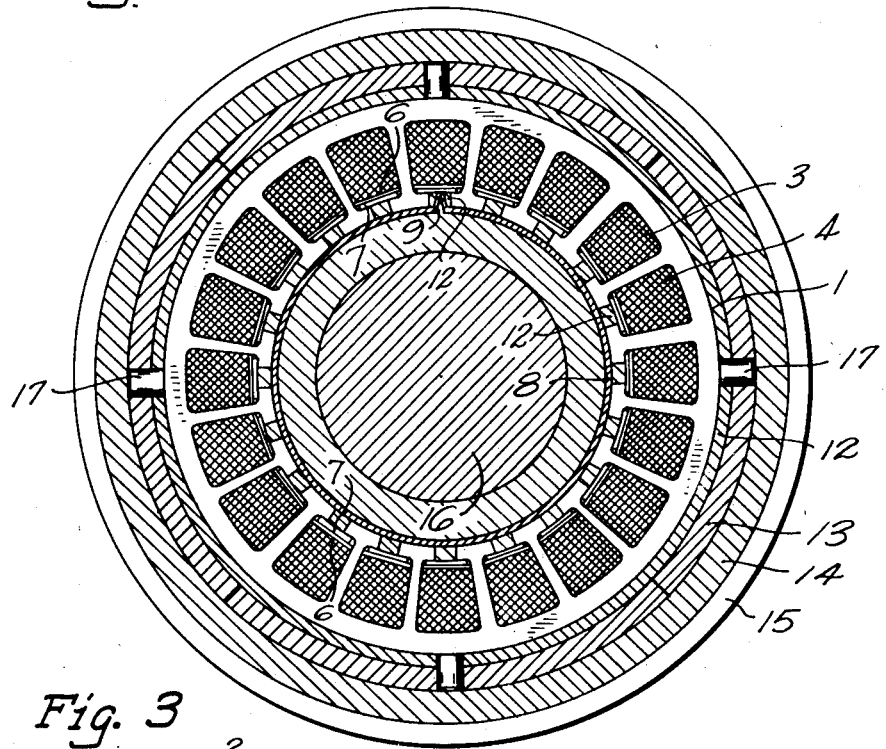
Fig. 2 is an enlarged detail section taken on line 2—2 of Figure 1.
Figure 3:
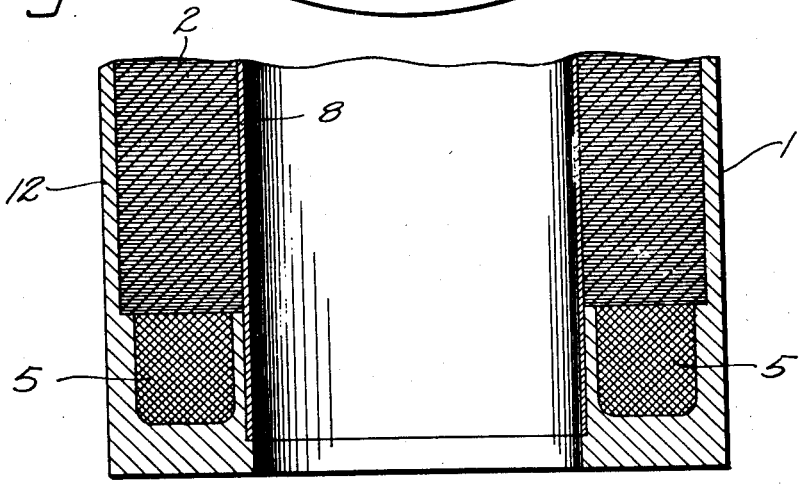
Fig. 3 is a fragmentary view of a stator completed in accordance with the invention under which the cast metal is bored out to the non-magnetic tube.

The drawings illustrate a stator 1 comprising a plurality of laminations 2 stacked together and having longitudinal slots 3 in which are disposed windings 4 with the end coils 5 of the windings extending outwardly from each end of the stacked laminations.

The mouth of each slot 3 is closed by a slot stick 6 of glass board or the like and a thin strip 7 of non-magnetic material. The slot stick 6 is located adjacent the windings while the strip 7 extends across the open mouth of the slot. The exposed or outside face of the strip 7 is coated with a protective coating of tin.

A thin sheet or tube 8 of non-magnetic material is disposed in the air gap of the stator and the ends 9 thereof are turned into the mouth of one of the slots 3 toward strip 7.

The leads 10 are attached to the end coils 5 of windings 4 and are surrounded with copper tubing 11.

The poured non-magnetic metal 12 comprising

2 generally a eutectic of tin and lead, completely encloses the laminations 2 and windings 4 and extends over the copper tubing 11 of leads 10. In addition metal 12 is disposed between the tube 8 in the air gap of the stator and strips 7 and solders the ends 9 of tube 8 securely within the mouth of the slot 3 in which the ends are located.

In constructing the stator 1 of the invention, after laminations 2 have been stacked together the windings 4 are located in slots 3, and the slot sticks 6 are slipped into the mouth of the slots to hold the windings in place.

The strips 7 are slipped into the mouth of the slots on top of slot sticks 6 with the tinned surface thereof to the outside of the respective slots.

Thereafter, the thin sheet or tube 8 is rolled into or otherwise provided in the air gap of stator 1 and the ends thereof are turned or depressed into one of the slots 3 to lock the tube to the stator laminations 2. The tube preferably extends longitudinally to a line slightly beyond the end coils 5 of the windings 4.

The leads 10 are surrounded with copper tubing 11 and the stator 1 is then disposed within a vertically disposed collapsible jig comprising a mold 13 formed of four parts and supported within the cylinder 14 on the cap or plate 15 which closes the bottom of the cylinder. A cylindrical tapered bar 16 extends upwardly within the cylinder from the center of plate 15. The inside surfaces of mold 13 and plate 15 may be painted with lime or the like to prevent the cast metal 12 from adhering thereto in the casting operation.

When the stator 1 is placed in mold 13, the bar 16 extends through the center air gap thereof to provide a hollow bore in the cast metal 12.

After the stator is placed within the mold 13, the dowels 17 are inserted to space the stator from the mold in position for pouring of the metal 12. Dowels 17 permit complete circulation of metal between the mold and the stator and determine the thickness thereof.

The cylinder 14 and the mold are secured together by the set screws 18 which are threaded through the cylinder and into contact with mold 13.

The mold 13 with stator 1 confined therein is next placed in the oven 19 and the mold and stator are heated to from 275° to 300° F. The metal 12 which is in a molten state is then poured into the stator from a suitable source not shown through the upper open end 20 of the cylinder 14. The mold and stator are then allowed to cool until the metal 12 hardens.

The metal 12 at the time of pouring has a temperature of approximately 380°. In the pouring operation the metal 12 flows into all the vacant spaces between the stator 1 and the mold 13. The metal 12 completely covers the laminations 2, the end coils 5, and lead tubing 11 adjacent the end coils. In addition the metal 12 fills the spaces between the strips 7 and the tube 8 and solders the longitudinal ends 9 of tube 8 securely within the mouth of one of the slots 3. The inner and outer ends of the tube 8 are also completely embedded in metal 12.

After cooling, the set screws 18 are unthreaded, and the stator 1 with metal 12 enveloping the same and mold 13 and mandrel 16 are removed from the cylinder 14. The parts of the mold 13 are separated from the outside of the molded stator and the mandrel 16 is removed from the inside of the stator. The outer surface of the poured stator is then finished to proper dimensions on the outside and is tinned, and then is bored out on the inside to the tube 8.

The metal 12 hermetically seals the various parts of the stator 1 against entry of oil or moisture thereto. The windings 4 are securely held against movement by metal 12 and cannot pulsate by change of frequency or other shocks to which the stator may be subjected.

The invention is applicable to any electromagnetic apparatus employing laminations and windings where it is desirable to seal off the same from oil, moisture, or the like.

Various embodiments of the invention may be employed within the scope of the accompanying claims.

I claim:

1. A metal cast dynamo electric element comprising a plurality of laminations stacked together and provided with longitudinally extending slots opening into the air gap thereof, electric windings disposed in said slots and having end coils extending from each end of the laminations, a non-magnetic strip closing the mouth of each slot, a thin non-magnetic sheet disposed adjacent the strips in the air gap and extending longitudinally along the air gap, and generally soft non-magnetic metal cast to completely surround said laminations, end coils and windings and to solder said thin metal sheet to the metal strips located in the mouth of the stator slots.

2. A metal cast dynamo electric element comprising a plurality of laminations stacked together and provided with longitudinally extending slots opening into the air gap thereof, a non-magnetic strip closing the mouth of each slot electric winding disposed in said slots and having end coils extending from each end of the laminations, a fluid resistant formed sheet of extremely thin non-magnetic material disposed in said air gap with the longitudinal ends thereof turned into one of said slots, and generally soft non-magnetic metal cast to completely surround said laminations, end coils and windings and to join the sheet at the longitudinal seam and to the laminations and windings within the stator air gap.

MARION B. SAWYER, Sr.

REFERENCES CITED

The following references are of record in the file of this patent:

UNITED STATES PATENTS

| Number | Name | Date |
| --- | --- | --- |
| 628,050 | Wait | July 4, 1899 |
| 1,190,054 | Wiard | July 4, 1916 |
| 1,535,330 | Mills | Apr. 28, 1925 |
| 1,974,183 | Gunderson | Sept. 18, 1934 |
| 2,283,146 | Zoller | May 12, 1942 |
| 2,340,905 | Sigmund et al. | Feb. 8, 1944 |
| 2,385,385 | Sigmund et al. | Sept. 25, 1945 |

FOREIGN PATENTS

| Number | Country | Date |
| --- | --- | --- |
| 463,015 | Great Britain | Mar. 19, 1937 |